United States Patent
Oroskar et al.

(10) Patent No.: US 9,749,907 B1
(45) Date of Patent: Aug. 29, 2017

(54) MANAGING WIRELESS COMMUNICATION SERVICE RESPONSIVE TO A THRESHOLD EXTENT OF FAILURE OF AN INTER-NETWORK FALLBACK PROCESS

(71) Applicant: Sprint Spectrum L.P., Overland Park, KS (US)

(72) Inventors: Siddharth S. Oroskar, Overland Park, KS (US); Jasinder P. Singh, Olathe, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 50 days.

(21) Appl. No.: 14/721,028

(22) Filed: May 26, 2015

(51) Int. Cl.
*H04W 36/00* (2009.01)
*H04W 76/02* (2009.01)

(52) U.S. Cl.
CPC ..... *H04W 36/0022* (2013.01); *H04W 76/027* (2013.01)

(58) Field of Classification Search
USPC ...................... 455/435.1, 436, 439
See application file for complete search history.

(56) References Cited

U.S. PATENT DOCUMENTS

| | | | |
|---|---|---|---|
| 8,687,598 B1 * | 4/2014 | Prock | H04W 36/0083 370/332 |
| 2010/0195616 A1 * | 8/2010 | Vikberg | H04W 36/0022 370/331 |
| 2010/0246530 A1 * | 9/2010 | Pehrsson | H04W 36/0022 370/331 |
| 2012/0002545 A1 | 1/2012 | Watfa et al. | |
| 2013/0286827 A1 | 10/2013 | Zakrzewski | |
| 2014/0010180 A1 | 1/2014 | Lee et al. | |
| 2014/0099952 A1 | 4/2014 | Bhatnagar et al. | |
| 2014/0348064 A1 | 11/2014 | Jeong et al. | |

OTHER PUBLICATIONS

First Action Interview Pilot Program Pre-Interview Communication from U.S. Appl. No. 14/488,181, dated Jul. 28, 2016.

* cited by examiner

*Primary Examiner* — Duc C Ho (57) ABSTRACT

Disclosed is a method and system to help manage communication in a network configured to support an inter-network fallback process in which the network passes pre-registration signaling and call-setup signaling between a fallback network and user equipment devices (UEs) served by the network to facilitate transition of UEs from being served over one air interface protocol by the network to being served with calls over a different air interface protocol by the fallback network. When the network detects a threshold extent of failure of the inter-network fallback process with respect to at least one UE served in a first coverage area provided by the network, the network may responsively direct one or more UEs served in the first coverage area to each hand over from the first coverage area to at least one second coverage area provided by the network instead of transitioning to be served by the fallback network.

20 Claims, 3 Drawing Sheets

---

A FIRST RAN DETECTS A THRESHOLD EXTENT OF FAILURE OF AN INTER-RAN FALLBACK PROCESS WITH RESPECT TO ONE OR MORE UEs THAT ARE EACH SERVED BY THE FIRST RAN IN A FIRST COVERAGE AREA OF THE PLURALITY OF COVERAGE AREAS PROVIDED BY THE FIRST RAN — 50

IN RESPONSE TO DETECTING THE THRESHOLD EXTENT OF FAILURE, THE FIRST RAN PROCESSES HANDOVER OF AT LEAST ONE UE FROM THE FIRST COVERAGE AREA PROVIDED BY THE FIRST RAN TO AT LEAST ONE SECOND COVERAGE AREA OF THE PLURALITY OF COVERAGE AREAS PROVIDED BY THE FIRST RAN — 52

MANAGING WIRELESS COMMUNICATION SERVICE RESPONSIVE TO A THRESHOLD EXTENT OF FAILURE OF AN INTER-NETWORK FALLBACK PROCESS

BACKGROUND

A typical radio access network (RAN) includes one or more base stations, each radiating to define one or more coverage areas, such as cells and cell sectors, in which user equipment devices (UEs) such as cell phones, tablet computers, tracking devices, embedded wireless modules, and other wirelessly equipped communication devices, can operate. Further, each base station of the RAN may then be coupled or communicatively linked with network infrastructure such as a switch or gateway that provides connectivity with one or more transport networks, such as the public switched telephone network (PSTN) and/or the Internet for instance. With this arrangement, a UE within coverage of the RAN may thus engage in air interface communication with a base station and thereby communicate via the base station with various remote network entities or with other UEs served by the RAN.

In general, a RAN may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the one or more coverage areas of such a RAN may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a RAN (e.g., powers on or moves into coverage of the RAN), the UE may detect a reference signal and read system information broadcast from a base station and may engage in a process to register itself to be served by the base station and generally by the RAN. For instance, the UE may transmit an attach message on an uplink control channel to the base station, and the base station and/or supporting infrastructure may then responsively authenticate and authorize the UE for service, establish a record indicating where in the RAN the UE is operating, establish local profile or context records for the UE, and provide an attach accept message to the UE.

Thereafter, the UE may then be served by the RAN in an idle mode or a connected/active mode. In the idle mode, the UE may monitor a downlink control channel to detect page messages and other information regarding incoming communications and may similarly transmit uplink control signaling to initiate communications or for other reasons. And in the connected/active mode, the UE may have particular traffic channel resources assigned by the RAN, which the UE may use to engage in communication of bearer traffic and the like.

When a UE is served in a particular base station coverage area, the UE may also regularly monitor the reference signal strength in that coverage area and in other coverage areas of the RAN, in an effort to ensure that the UE operates in the best (e.g., strongest) coverage area. If the UE detects threshold weak coverage from its serving coverage area and sufficiently strong coverage from another coverage area, the UE may then engage in a handover process by which the UE transitions to be served by the other coverage area. In the idle mode, the UE may do this autonomously and might re-register in the new coverage area. Whereas, in the connected/active mode, the UE may regularly report signal strengths to its serving base station when certain thresholds are met, and the base station and/or supporting infrastructure may work to hand the UE over to another coverage area.

Some wireless communication systems may encompass multiple separate but interconnected RANs, such as a first RAN that provides high speed data communications and a second RAN (i.e., a "fallback" RAN) that provides traditional telephony service, each RAN operating in accordance with a different air interface protocol. Such a hybrid system may be configured to support an inter-RAN fallback process in which the first RAN passes pre-registration signaling and call-setup signaling between the fallback RAN and UEs served by the first RAN in order to facilitate transition of UEs from being served by the first RAN to being served with voice calls by the fallback RAN. For instance, a hybrid system that includes an LTE RAN for data communications and a circuit-switched RAN, such as a CDMA RAN (or GSM RAN or the like), for legacy telephone service may support an example inter-RAN fallback process referred to as "circuit-switched fallback" (CSFB). With such an arrangement, a UE may be programmed to scan for and attach with the LTE RAN by default and to then register with the CDMA RAN by engaging in pre-registration signaling through the LTE RAN. In particular, after the UE attaches with an LTE base station, the UE may then transmit to the LTE base station a CDMA pre-registration request message, and that message may pass through the LTE RAN to the CDMA RAN, leading to pre-registration of the UE with the CDMA RAN. Thereafter, when the UE has a voice call to place or the CDMA RAN has a voice call to connect to the UE, call-setup signaling may similarly pass between the UE and the CDMA RAN via the LTE RAN, at which point the UE may then conveniently switch over to be served by a CDMA base station and to engage in the call.

OVERVIEW

Unfortunately, however, the inter-RAN fallback process described above may occasionally fail. For instance, failures may occur in the pre-registration signaling, in the call setup signaling, and/or in other aspects of the inter-RAN fallback process. As a result, the UE may detect the failure(s) and responsively enter "long-term failure" mode by leaving service of the first RAN altogether, transitioning to be served directly by the fallback RAN, and operating via the fallback RAN for an extended period of time, such as thirty minutes, an hour, or longer. During this extended period of time, the fallback RAN may provide the UE with poorer or otherwise less desirable user experience than the UE would have received from first RAN.

Disclosed herein is a method and system to help manage wireless communications in a hybrid system such that, in the event of one or more failures of the inter-RAN fallback process, UE(s) will be directed to continue being served by the first RAN so that the UE(s) will not enter long-term failure mode and leave service of the first RAN. In accordance with the disclosure, when the first RAN detects a threshold extent of failure of the inter-RAN fallback process (e.g., CSFB) with respect to at least one UE served in a coverage area provided by the first RAN, the first RAN will responsively direct one or more UEs served in that coverage area to each hand over to another coverage area provided by the first RAN so that the UE(s) will not transition to be served directly by the fallback RAN. As a result, the UE(s) may receive a more desirable user experience in this other coverage area of the first RAN than they would have received while operating in long-term failure mode. And further, while in this other coverage area, the UE(s) could attempt again to successfully engage in the inter-RAN fallback process and be served with voice calls by the fallback RAN.

The failure(s) that cause the first RAN to respond in this way could involve one UE and/or or multiple UEs. For example, a single UE served in a given coverage area of the first RAN may experience a failure of the inter-RAN fallback process and indicate the failure to the first RAN. The first RAN may then respond by directing that UE (and possibly more UEs served in that coverage area) to hand over to another coverage area provided by the first RAN. As another example, a plurality of UEs served in a given coverage area may experience and indicate a quantity of failures of the inter-RAN fallback process. Provided that the quantity of failures exceeds a predetermined threshold, the first RAN may respond to the quantity of failures by directing one or more UEs served in that coverage area to each hand over to another coverage area provided by the first RAN. In either of these examples, the first RAN may alternatively detect failures experienced by UE(s) without having to learn of the failures from the UE(s) at issue.

Accordingly, in one respect, disclosed is a method for managing wireless communication service. The method may involve a first RAN providing a plurality of coverage areas in which to serve UEs according to a first air interface protocol, where the first RAN is interconnected with a fallback RAN that is configured to serve UEs according to a second air interface protocol, and where the first RAN is configured to support an inter-RAN fallback process in which the first RAN passes pre-registration signaling and call-setup signaling between the fallback RAN and UEs served by the first RAN to facilitate transition of UEs from being served over the first air interface protocol by the first RAN to being served with calls over the second air interface protocol by the fallback RAN. Further, the method may involve the first RAN detecting a threshold extent of failure of the inter-RAN fallback process with respect to one or more UEs that are each served by the first RAN in a first coverage area of the plurality of coverage areas provided by the first RAN. The method may then involve, responsive to detecting the threshold extent of failure, the first RAN processing handover of at least one UE from the first coverage area provided by the first RAN to at least one second coverage area of the plurality of coverage areas provided by the first RAN.

In another respect, the disclosed method may involve the first RAN detecting a failure of the inter-RAN fallback process with respect to a particular UE served by the first RAN in a first coverage area of the plurality of coverage areas provided by the first RAN. In accordance with the method, responsive to detecting the failure with respect to the particular UE, the first RAN processes handover of one or more UEs, including the particular UE, from the first coverage area provided by the first RAN to at least one second coverage area of the plurality of coverage areas provided by the first RAN.

Further, in another respect, disclosed is a RAN comprising one or more base stations radiating to define a plurality of coverage areas in which to serve UEs according to a first air interface protocol. The RAN further comprises a communication interface with a fallback RAN, where the fallback RAN is configured to serve UEs according to a second air interface protocol different from the first air interface protocol. The RAN still further comprises a controller comprising at least one processing unit, data storage, and program instructions stored in the data storage and executable by the at least one processing unit to carry out operations. In accordance with the disclosure, the operations include passing, via the communication interface, pre-registration signaling and call-setup signaling between the fallback RAN and UEs served by the RAN to facilitate a CSFB process in which UEs transition from being served over the first air interface protocol by the RAN to being served with calls over the second air interface protocol by the fallback RAN. Further, the operations include detecting a threshold extent of failure of the CSFB process with respect to at least one UE that is served in a first coverage area of the plurality of coverage areas provided by the RAN, and then, responsive to detecting the threshold extent of failure, directing one or more UEs to each hand over from the first coverage area to at least one second coverage area of the plurality of coverage areas provided by the RAN.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of a hybrid LTE/CDMA communication system that supports CSFB. However, it should be understood that principles described herein can apply as well in numerous other contexts, such as in numerous other RAN arrangements, and with various other protocols or combination of protocols. Further, it should be understood that the various arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

Figure 1:
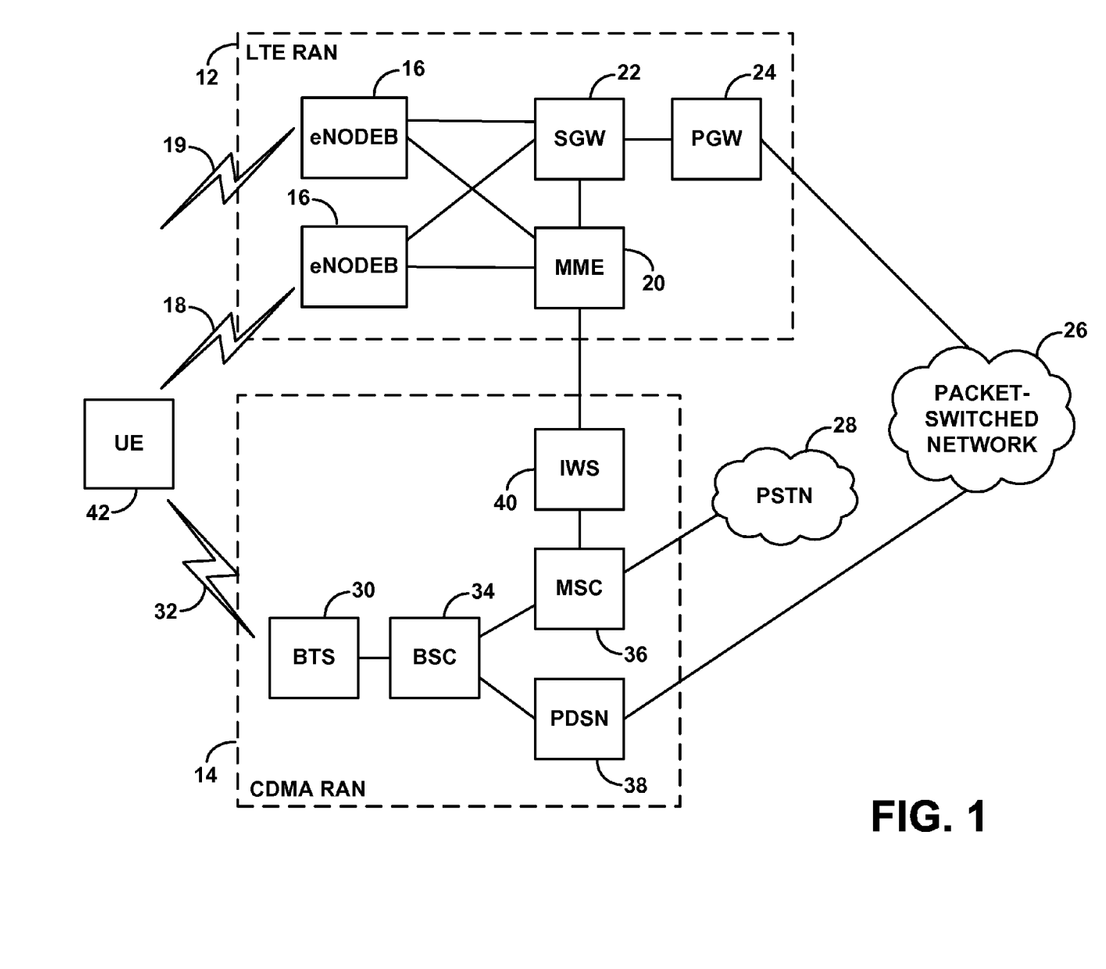
FIG. 1 is a simplified block diagram of a network arrangement in which aspects of the present disclosure can be implemented.

FIG. 1 is a simplified block diagram of an example system, including an LTE RAN 12 and a CDMA RAN 14, where the CDMA RAN is a fallback network in line with the discussion above. In the example system, the LTE RAN primarily serves UEs with wireless packet data communication service. Whereas the CDMA RAN primarily serves UEs with wireless circuit-switched voice call service but may also provide packet-data communication service and other types of service. These RANs may be owned or operated by a common wireless service provider, which may enable the provider to serve UEs with high speed packet data service (including possibly voice-over-packet service) through the LTE RAN and traditional cellular voice call service through the CDMA RAN.

The LTE RAN 12 in the example system is shown including representative LTE base stations 16 known as eNodeBs, which each include an antenna structure and associated equipment for providing a respective LTE coverage area in which UEs can be served by the eNodeB on a respective carrier frequency and thus by the LTE RAN. For instance, the eNodeBs 16 may include at least a first eNodeB and a second eNodeB for providing coverage area 18 and coverage area 19, respectively, as shown. These and other possible eNodeBs of the LTE RAN may be co-located with each other or may be located elsewhere from each other (e.g., adjacent to each other), and thus their coverage areas may either emanate from the same location or may emanate from different locations.

Further, the eNodeBs 16 are shown having a communication interface with a mobility management entity (MME) 20 that functions as a signaling controller for the LTE RAN. Still further, the eNodeBs are also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN may sit as nodes on a private packet-switched network owned by an operator of the LTE RAN, and thus the various communication interfaces may be logical interfaces through that network.

The CDMA RAN 14 is shown including a representative CDMA base station 30 known as a base transceiver station (BTS), which includes an antenna structure and associated equipment for providing a CDMA coverage area 32 in which UEs can be served by the BTS and thus by the CDMA RAN. The BTS is then shown in communication with a base station controller (BSC) 34, which is in turn shown in communication with a mobile switching center (MSC) 36 that provides connectivity with the PSTN 28 and in communication with a packet data serving node (PDSN) 38 that provides connectivity with the packet-switched network 26.

In practice, coverage area 32 may be "homed" to MSC 36, which means that the BTS that radiates to define coverage area 32 (i.e., BTS 30) is communicatively linked to or integrated with MSC 36 such that MSC 36 can control aspects of that BTS. Other CDMA coverage areas (not shown) may exist in this hybrid system as well, some of which may be homed to MSC 36 and some of which may be homed to other MSCs of the CDMA RAN (not shown).

Further shown in FIG. 1 is an interworking server (IWS) 40, which provides connectivity between the LTE RAN and the CDMA RAN to facilitate exchange of signaling messages (such as CSFB registration and call-setup messages, etc.) between the RANs. The IWS may be provided as an element of either one of the RANs or as an element separate from but connected to each RAN, and in a representative arrangement as shown has a communication interface (e.g., an S102 interface) with the MME of the LTE RAN and a communication interface with the MSC of the CDMA RAN. In practice, the IWS may conveniently facilitate setup of CDMA calls for a UE while the UE is served by the LTE RAN, so that the UE can then seamlessly transition from being served by the LTE RAN to engaging in the calls served by the CDMA RAN. In particular, certain call setup signaling that would normally flow over the CDMA air interface between the UE and a CDMA BTS and in turn between the BTS and the MSC will instead flow over the LTE air interface between the UE and an LTE eNodeB, between the eNodeB and the MME, between the MME and the IWS, and between the IWS and the MSC.

In line with the discussion above, FIG. 1 illustrates a representative UE 42 located within both coverage area 18 of the LTE RAN and coverage area 32 of the CDMA RAN. This UE is a hybrid telephony device (e.g., cell phone or other such device) that is "CSFB-capable," meaning that the UE is arranged to support both LTE service and CDMA service, and further arranged to engage in signaling with the CDMA RAN via the LTE RAN to facilitate transition of the UE from being served by the LTE RAN to being served with voice calls by the CDMA RAN. For instance, a CSFB-capable UE may include both a CDMA radio for being served by the CDMA RAN and a LTE radio for being served by the LTE RAN, and may also include program logic that allows the UE to engage in the CSFB process described above.

In practice, upon entry into coverage area 18 of the LTE RAN, even though CDMA coverage area 32 exists there too, the UE attaches with the eNodeB that is providing coverage area 18 by engaging in attach signaling with that eNodeB and the MME. Through this attach signaling, the MME may learn that the UE is CSFB-capable. For instance, the UE may provide to the MME profile information indicating that the UE is CSFB-capable. Alternatively, when the MME is authenticating and authorizing the UE for LTE service, the MME may receive such UE profile information from other supporting infrastructure, such as a home subscriber server (not shown), and store this information in a context record for the UE. Normally attach signaling, as well as other signaling, passes between the UE and the MME over a signaling layer known as a non-access stratum (NAS) layer.

As noted above, the hybrid system shown in FIG. 1 is arranged to support CSFB operation. To facilitate CSFB operation in practice with this arrangement, each eNodeB may broadcast as system information an indication of whether the eNodeB currently supports providing CSFB service. For instance, this information may include an LTE "system information block #8" (SIB8) message that specifies information about the CDMA RAN, such as identifiers of CDMA coverage areas homed to the MSC, to enable the UE to scan for coverage of the CDMA RAN as part of the CSFB pre-registration process. Further or alternatively, this information may include a particular flag or message in a SIB8 or the like, such as a "CSFB-RegistrationParam1× RTT" information element for instance, the presence of which indicates LTE RAN support for providing CSFB service and may trigger the UE to attach with that eNodeB.

In an example CSFB process, after the UE attaches with (registers with) the eNodeB as noted above, the UE may then engage in pre-registration signaling with the CDMA RAN via the eNodeB, the MME, and the IWS, so that the UE can then seamlessly transition later from being served by the LTE RAN to being served with a call by the CDMA RAN. For instance, the UE may transmit a pre-registration request message via the eNodeB to the MME over the NAS layer, and may include in the pre-registration request message certain information about the CDMA RAN to facilitate pre-registration, such as a CDMA coverage area identifier as noted above. The MME may then pass the message to the IWS via the S102 interface, and in turn the IWS may pass the message to the MSC of the CDMA RAN. If the MSC receives this pre-registration request message, then the MSC may send to the UE a positive acknowledgement message (ACK) indicating the receipt. Further upon receipt of this message, the MSC (in cooperation with a home location register (HLR) and/or other network infrastructure of the CDMA RAN) may determine whether the UE is authorized to register with the CDMA RAN. If the MSC determines that the UE is authorized, the MSC may indicate to the UE in the ACK, or by sending a separate response message to the UE, that the UE has successfully pre-registered with the MSC of the CDMA RAN.

Further, as part of this CSFB process, the LTE RAN may pass call-setup signaling between the UE and the CDMA RAN when the UE has a call to place (i.e., an outgoing call from the UE) or when the CDMA RAN has a call to connect to the UE (i.e., an incoming call to the UE). For instance, when the CDMA RAN has a CSFB call to connect to the UE, the CDMA RAN may send a page message (or page message trigger) to the IWS, which the IWS may pass along to the LTE RAN to trigger paging of the UE via the LTE RAN. The LTE RAN may then responsively page the UE by having the eNodeB transmit a CSFB page message to the UE. Once the UE responds to this CSFB page, the UE may then send a CSFB extended service request message to the eNodeB to request setup of the CSFB call. And likewise, when the UE seeks to place a CSFB call, the UE may establish connectivity with the eNodeB and may send a CSFB extended service request message to the eNodeB to request setup of that CSFB call. This CSFB extended service request message may pass via the MME and the IWS to the MSC to trigger or facilitate setup of the call. The UE may then transition from being served from the LTE RAN to being served with the call by the CDMA RAN.

At some point during this process, in order to facilitate setup of the call in an appropriate CDMA coverage area, the UE may be arranged to scan for CDMA coverage and provide a measurement report to the LTE RAN indicating certain detected CDMA coverage. By way of example, the UE may, on its own or at the request of the LTE RAN, scan for CDMA pilot signals and corresponding signal strengths and transmit to the eNodeB a measurement report including one or more strongest detected pilot signals. The eNodeB may then pass the report via the MME and the IWS to the MSC with which the UE is pre-registered. The MSC may then use the report to determine a CDMA coverage area and traffic channel to assign to the UE, and in turn complete the setup so that the UE can transition to engage in the CSFB call via the assigned CDMA coverage area associated to the MSC. Further, at some point in anticipation of, during, or in response to transition of the UE from being served by the LTE RAN to being served with the CSFB call by the CDMA RAN, the UE may transmit to the MME via the eNodeB a context release request message that includes a cause code or other data interpretable by the LTE RAN entity to indicate that CSFB is the reason for this transition. Receipt of the context release request message may cause the MME to responsively (i) suspend bearer(s) and/or context record(s) that the LTE RAN had allocated for use in serving the UE and (ii) update its stored context record(s) for the UE to include a flag or other indication that the bearer(s) are suspended and that the UE is not currently being served by the LTE RAN.

As noted above, this CSFB process may fail during pre-registration. For example, the eNodeB may broadcast a SIB8 message that specifies erroneous information about the CDMA RAN, such as an identifier of a CDMA coverage area that is not homed to the MSC with which the UE is attempting pre-registration (the MSC to which the MME and IWS would forward a UE's pre-registration request). Thus, if the UE's pre-registration request message includes this identifier or other erroneous information, the MSC may refuse the requested pre-registration, perhaps on grounds that the identified CDMA coverage area is not homed to the MSC. The MSC may then send to the UE a pre-registration failure message, a negative acknowledgement message (NACK), or other response message notifying the UE that the MSC has refused the requested pre-registration, and the UE may interpret receipt of this message as a CSFB pre-registration failure. Alternatively, the MSC may send no response message to the UE, and the UE may interpret non-receipt of such a response as a CSFB pre-registration failure.

As another example, the UE's pre-registration request message may not be received by the MSC, perhaps due to the S102 interface or other network interface failing (e.g., a transmission line being cut or damaged), or perhaps due to the MME, IWS, and/or the MSC ceasing to work or experiencing other problems with routing or receiving CSFB pre-registration signaling. The UE may detect this particular CSFB pre-registration failure in various ways. For instance, after transmitting the pre-registration request message, the UE may be arranged to wait a predefined period of time for a response message from the MSC (e.g., an ACK), but may detect that it has not received a response within that period of time and interpret such a detection as a CSFB pre-registration failure.

As yet another example, upon receipt of the pre-registration request message, the MSC may determine that the UE is not authorized to register with the CDMA RAN and responsively refuse the requested pre-registration, perhaps on grounds that the HLR has no valid account stored for the UE, or has stored an account for the UE that indicates the UE is roaming or otherwise unauthorized. If the MSC determines that the UE is unauthorized, the MSC may send to the UE a NACK or other response message (e.g., a pre-registration failure message) that indicates to the UE the CSFB pre-registration failure. Alternatively, in line with the discussion above, the MSC may respond to its determination that the UE is unauthorized by sending no response message to the UE, and the UE may interpret non-receipt of such a response as the CSFB pre-registration failure.

As further noted above, this CSFB process may fail during call-setup. By way of example, the strongest CDMA coverage area that the UE detects may be a coverage area of a BTS that is not homed to the MSC with which the UE is pre-registered (i.e., homed to a different MSC). Thus, when the UE reports that detected CDMA coverage area to the MSC via the LTE RAN, the MSC may reject or disregard the call setup effort because the reported coverage area is not under the MSC's control. If the MSC rejects the call setup effort, the MSC may send to the UE a call-setup failure message notifying the UE that the MSC has rejected the call setup effort, and the UE may interpret receipt of this message as a CSFB call-setup failure. Alternatively, if the MSC disregards the call setup effort, the UE may be arranged to wait a predefined period of time for a response from the MSC, and thus may detect that a CSFB call-setup failure has occurred if the UE receives no such response within that period of time.

It should be understood that these CSFB failures, both pre-registration and call-setup failures, are provided as examples and that the CSFB process may fail in other manners and for various other reasons.

In response to detecting any of the CSFB failures discussed above, the UE may transmit to an entity of the LTE RAN, such as the MME or UE's serving eNodeB, a context release message including a cause code or other data interpretable by the LTE RAN entity to indicate the pre-registration failure or call-setup failure. Alternatively, the eNodeB, MME, and/or other entities of the LTE RAN network infrastructure might detect the CSFB failures without having to learn of the CSFB failures from the UE(s) at issue. For instance, such entities may be configured to perform deep packet inspection on pre-registration and/or call-setup signaling. In this manner, such entities can monitor this signaling and thereby detect occurrences of CSFB failures. By way of example, an MME or the UE's serving eNodeB may use deep packet inspection to detect that a NACK or other type of pre-registration/call-setup failure notification has been transmitted from the CDMA RAN to the UE. As another example, the MME or the UE's serving eNodeB may be arranged to wait a predefined period of time after transmitting a pre-registration request message from the UE to the CDMA RAN, and thus may detect that a pre-registration failure has occurred if a response is not received from the CDMA RAN during that period of time. Other examples are possible as well.

As noted above, when a UE experiences a CSFB failure, it may normally respond by entering long-term failure mode, in which the UE leaves service of the LTE RAN altogether, transitions to be served directly by the CDMA RAN, and operates via the CDMA RAN for an extended period of time (e.g., thirty minutes, an hour, or longer). During this extended period of time, the CDMA RAN may provide the UE with a quality of user experience that is lower or otherwise less desirable than the quality of user experience that the LTE RAN would have provided to the UE if the UE had continued to be served by the LTE RAN.

Thus, when a UE experiences a CSFB failure, it may be advantageous for the LTE RAN to provide a mechanism to cause that UE and/or other UEs served by the LTE RAN to continue to be served by the LTE RAN so that the UE(s) will not enter long-term failure mode and leave service of the LTE RAN. In accordance with the present disclosure, when the LTE RAN detects a threshold extent of CSFB failure with respect to one or more UEs served in a first LTE coverage area, the LTE RAN may responsively direct one or more UEs served in the first LTE coverage area to each hand over to another LTE coverage area. In the arrangement of FIG. 1, for instance, if the LTE RAN detects a threshold extent of CSFB failure with respect to at least one UE served in coverage area 18 (possibly including UE 42), the LTE RAN may responsively direct one or more UEs served in coverage area 18 to each hand over to another LTE coverage area, such as coverage area 19.

As noted above, the threshold extent of CSFB failure that causes the LTE RAN to respond in this way may involve CSFB failure experienced by a single UE. In an example implementation, the LTE RAN may detect a single instance of failure experienced by a UE served in the first LTE coverage area and direct that UE to hand over to another LTE coverage area in response to the detection of that failure. Additionally or alternatively, in response to the detection of this single instance of failure, the LTE RAN may direct one or more other UEs served in the first LTE coverage area to each hand over to another LTE coverage area (e.g., the same coverage area to which the UE that experienced the failure was handed over, or a different coverage area). To facilitate this in practice, in response to detecting the failure, the LTE RAN may (i) determine which one or more of the UEs being served in the first LTE coverage area are each CSFB-capable (e.g., by the MME referring to UE profile information, as discussed above), and then (ii) direct each determined UE to hand over to another LTE coverage area. In this manner, the LTE RAN can proactively direct other CSFB-capable UEs served in the first LTE coverage area to hand over to another LTE coverage area before those UEs themselves experience CSFB failures.

Furthermore, the threshold extent of CSFB failure that causes the LTE RAN to respond in this way could involve CSFB failure experienced by multiple UEs. In an example implementation, the LTE RAN may detect a threshold extent of CSFB failures experienced by one or more UEs served in the first LTE coverage area and responsively direct the UE(s) that experienced the failure(s) and/or other CSFB-capable UE(s) served in the first LTE coverage area to each hand over to another LTE coverage area. To facilitate this in practice, for instance, the LTE RAN may detect a quantity of CSFB failures experienced by UE(s) served in the first coverage area, such as two or more CSFB failures. If the LTE RAN then determines that the detected quantity meets certain conditions, the LTE RAN may responsively direct those UE(s) and/or other CSFB-capable UE(s) served in the first LTE coverage area to each hand over to another LTE coverage area. For instance, such conditions may be based on the number of detected CSFB failures, and thus the LTE RAN may respond this way if the detected quantity exceeds the predefined threshold. Additionally or alternatively, such conditions may be based on when the CSFB failures are detected, and thus the LTE RAN may respond this way if each of the detected quantity of CSFB failures occurred recently, such as within a predefined period of time preceding the most recently-detected CSFB failure.

As noted above, responsive to the LTE RAN detecting the threshold extent of CSFB failure, the LTE RAN may process handover of a given UE from the first LTE coverage area (the source eNodeB) to another LTE coverage area (the target eNodeB), such as a coverage area that is either co-located with or neighboring the first LTE coverage area. For instance, in an example implementation, the source eNodeB (i.e., the UE's serving eNodeB) may select the target eNodeB to which the source eNodeB will hand over the UE based on measurement reports that the UE has provided to the source eNodeB. These measurement reports may indicate, for instance, that a particular other LTE coverage area is sufficiently strong for serving the UE (even though the coverage strength of the particular other LTE coverage area may not have been strong enough to automatically trigger handover of the UE to that other LTE coverage area in the first place).

In an alternative implementation, the source eNodeB may maintain a list of other LTE coverage areas, and may broadcast the list (e.g., in a SIBS message) and/or may transmit the list directly to the UE. Upon receipt of the list, the UE may scan for and detect coverage of the listed LTE coverage areas and provide a measurement report of the detected coverage to the source eNodeB so that the source eNodeB may then select a target eNodeB to which to hand over the UE. The source eNodeB may provide this list as or with a request for the UE to provide such a report responsive to the source eNodeB detecting a threshold extent of CSFB failure in the first LTE coverage area.

Furthermore, the LTE RAN may take into account additional considerations when selecting a target eNodeB to which to hand over the UE. In accordance with the present disclosure, for instance, the LTE RAN may consider whether other target eNodeBs support CSFB in their respective coverage areas. To facilitate this in practice, the source eNodeB may be configured to receive, from other LTE eNodeBs (or from the MME), data that indicates whether those eNodeBs support CSFB. This data may indicate CSFB support with varying granularity. For instance, the data may include a binary-type value that simply indicates CSFB support or no CSFB support for a given eNodeB. Additionally or alternatively, the data may indicate, for a given eNodeB, whether that eNodeB has experienced a threshold extent of CSFB failure (e.g., a quantity of recent CSFB failures that exceed a predefined threshold), or whether that eNodeB has experienced a low extent of CSFB failure (e.g., no failures, or a quantity of failures that is below a predefined threshold). Further, as an even more specific indication of whether that eNodeB has experienced a threshold extent of CSFB failure or a low extent of CSFB failure, the data may indicate how many CSFB failures were experienced and/or how recently the CSFB failures were experienced.

When processing handover with this data, for example, the source eNodeB may refer to the measurement report(s) received from the UE(s) in the first LTE coverage area and use the data to select from the report a LTE coverage area that supports CSFB. The LTE RAN may then process handover of the UE from the first LTE coverage area to the selected coverage area. As another example, the source eNodeB may maintain a list of other LTE coverage areas, as noted above, and may use the data to restrict this list to only include LTE coverage areas that support CSFB. The source eNodeB may then provide this list to the UE to trigger the UE to detect and report coverage of the listed LTE coverage areas so that the source eNodeB may then cause the UE to hand over to an appropriate target eNodeB. In this manner, the LTE RAN can restrict handover to a target eNodeB that has not recently experienced CSFB failure(s). Alternatively, the LTE RAN may not restrict handover to a target eNodeB that has not experienced CSFB failure(s). Rather, the LTE RAN may simply direct the UE to hand over to the strongest reported LTE coverage area without taking into account whether that target coverage area has experienced a threshold extent of CSFB failure. In this scenario, if the coverage area to which the UE is handed over has experienced (or later experiences) a threshold extent of CSFB failure, the LTE RAN might perform the disclosed process at some point after the UE has been handed over so that the UE does not leave LTE service.

Once a target eNodeB is selected, the source eNodeB may then direct the UE to hand over to the selected eNodeB. For instance, the source eNodeB may transmit a handover request via an inter-eNodeB "X2" interface to the target eNodeB to prepare the target eNodeB to receive handover of the UE. In turn, the target eNodeB may transmit to the source eNodeB a handover request acknowledge message that carries information such as an identifier of the target eNodeB for use by the UE to engage in communication with the target eNodeB. The source eNodeB may then transmit that information to the UE in a radio-resource-control (RRC) connection reconfiguration message that essentially functions as a handover directive to cause the UE to hand over to the target eNodeB.

In the arrangement shown in FIG. 1, for instance, upon detecting a threshold extent of CSFB failure with respect to coverage area 18, LTE RAN 12 may determine, using one or more aspects of the process discussed above, that coverage area 19 supports CSFB and is sufficiently strong for serving UE 42. The LTE RAN may then select the eNodeB that provides coverage area 19 to be the target eNodeB to which the LTE RAN will hand over UE 42. The LTE RAN may then direct UE 42 (and possibly other CSFB-capable UEs served in coverage area 18) to hand over to the selected eNodeB so that UE 42 can continue to be served by the LTE RAN in coverage area 19.

Moreover, the LTE RAN can take other actions in response to detecting a threshold extent of CSFB failure as well. As discussed above, each eNodeB may broadcast as system information, in a SIB8 or other message, an indication of whether that eNodeB currently supports providing CSFB service. In some implementations, for instance, a given eNodeB may by default broadcast an indication that it supports CSFB. If the LTE RAN detects a threshold extent of CSFB failure with respect to the given eNodeB, however, the LTE RAN may responsively configure the given eNodeB to notify UEs that the given eNodeB does not support CSFB. For example, the LTE RAN may configure the given eNodeB to stop broadcasting the indication. As such, when the given eNodeB is not broadcasting the indication, UEs that are CSFB-capable may forego attaching to the given eNodeB and/or may avoid reporting coverage of the given eNodeB when reporting possible target coverage to their serving eNodeB(s) for handover purposes, as discussed above. As another example, the LTE RAN may configure the given eNodeB to broadcast a parameter or other indication that the given eNodeB does not support CSFB. Further, the LTE RAN could also configure the given eNodeB to notify other eNodeBs as well that the given eNodeB does not support CSFB, such as by sending an indication to the other eNodeBs that the given eNodeB does not support CSFB. These other eNodeBs could then perhaps take this indication into account when processing handover of their own UEs in accordance with the disclosure.

Figure 2:
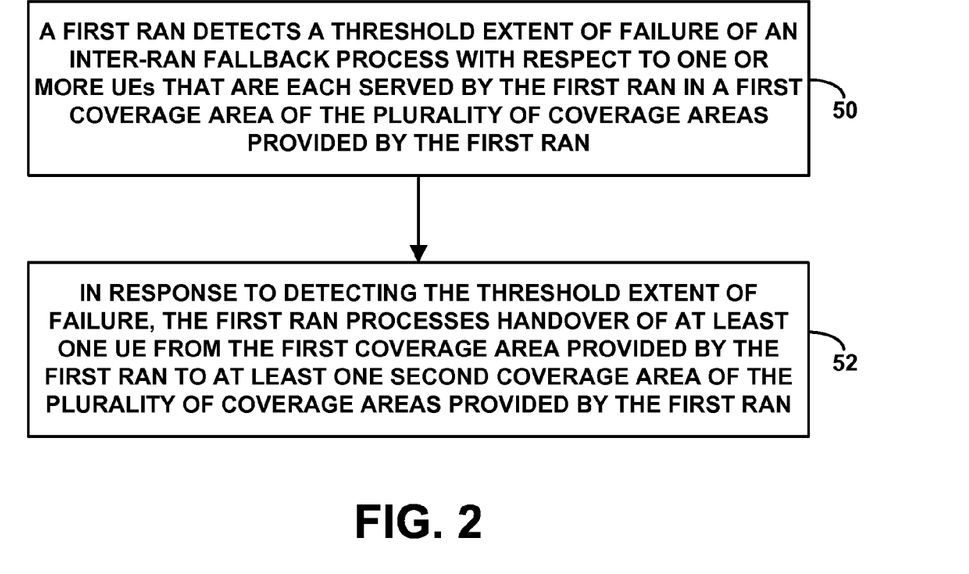
FIG. 2 is a flow chart depicting functions that can be carried out in accordance with the present disclosure.

FIG. 2 is next a flow chart depicting operations of a first RAN such as the LTE RAN 12 in line with the discussion above, which would be configured to provide a plurality of coverage areas in which to serve UEs according to a first air interface protocol (e.g., LTE). The first RAN would also be interconnected with a fallback RAN that serves UEs according to a second air interface protocol, such as the CDMA RAN 14 discussed above. And further, the first RAN would be configured to pass pre-registration signaling and call-setup signaling between the fallback RAN and UEs served by the first RAN to facilitate an inter-RAN fallback process (e.g., CSFB) in which UEs transition from being served over the first air interface protocol by the first RAN to being served with calls over the second air interface protocol by the fallback RAN.

As shown in FIG. 2, at block 50, the first RAN detects a threshold extent of failure of the inter-RAN fallback process with respect to one or more UEs that are each served by the first RAN in a first coverage area of the plurality of coverage areas provided by the first RAN. And at block 52, in response to detecting the threshold extent of failure, the first RAN processes handover of at least one UE from the first coverage area provided by the first RAN to at least one second coverage area of the plurality of coverage areas provided by the first RAN. As noted above, the at least one second coverage area could emanate from the same location as the first coverage area or from different locations.

In line with the discussion above, the threshold extent of failure may involve a single failure experienced by a single UE that is served in the first coverage area. For instance, the first RAN may detect that a single UE served in the first coverage area has experienced an inter-RAN fallback failure, and in response to detecting that specific inter-RAN fallback failure, the first RAN may direct that UE to hand over to a second coverage area provided by the first RAN, and may also proactively direct one or more other UEs served in the first coverage area to each hand over to other coverage area(s) provided by the first RAN. Alternatively, the threshold extent of failure may involve multiple failures experienced by UE(s) served in the first coverage area. For instance, the first RAN may detect that UE(s) served in the first coverage area have experienced a quantity of at least two inter-RAN fallback failures. If the first RAN then determines that (i) the detected quantity exceeds a predefined threshold and/or (ii) each of the detected quantity of failures occurred within a predefined period of time preceding the most recently-detected failure, the first RAN may responsively direct one or more UEs served in the first coverage area to each hand over to other coverage area(s) provided by the first RAN.

Furthermore, regardless of how many inter-RAN fallback failures the first RAN detects with respect to the first coverage area, the first RAN may direct UE(s) to hand over only to coverage area(s) that the first RAN has detected to have experienced a low extent of failure of the inter-RAN fallback process (e.g., no failures, or a quantity of failures that is below a predefined threshold). Alternatively, the first RAN may not take into account whether the other coverage area(s) have experienced a threshold extent of failure, and may instead merely direct UE(s) to each hand over to the strongest reported coverage area(s).

Figure 3:
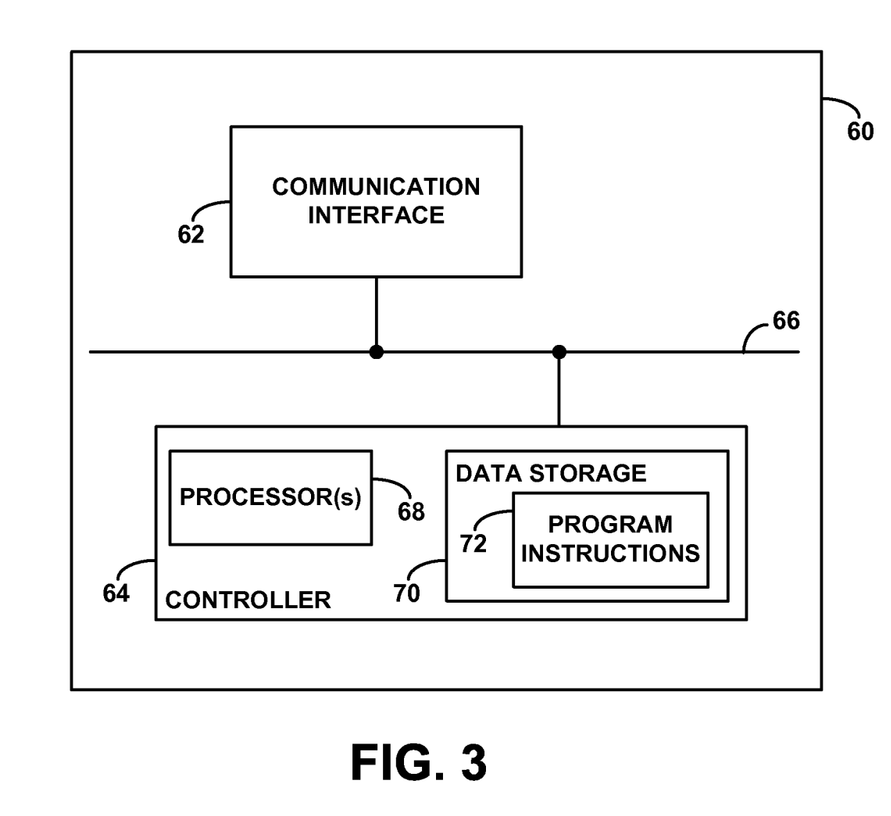
FIG. 3 is a simplified block diagram of a base station operable in accordance with the disclosure.

Finally, FIG. 3 is a simplified block diagram of an example RAN entity 60 that operates according to a first air interface protocol, such as any given LTE eNodeB or MME as discussed above. As shown, the example RAN entity 60 includes a communication interface 62 through which to engage in communication with a fallback RAN that serves UEs according to a second air interface protocol different from the first air interface protocol. Through this communication interface or one or more other communication interfaces, the RAN entity can also engage in communication with other RAN entities and/or with one or more UEs served by the RAN. Further, the example RAN entity also includes a controller 64 configured to cause the RAN entity to carry out various operations described herein. The communication interface and the controller are further shown to be in communication with each other by way of a system bus, network or other connection mechanism 66.

The controller 64 may take various forms, including various combinations of hardware, firmware, and software for instance. By way of example, the controller could comprise at least one processor 68, such as one or more general purpose processors (e.g., microprocessors) and/or one or more special purpose processors (e.g., application specific integrated circuits). The controller could also comprise one or more non-transitory data storage elements (e.g., magnetic, optical, and/or flash storage), such as data storage 70. The data storage could then hold program instructions 72 executable by the processor(s) 68 to carry out various operations described herein. Additionally or alternatively, however, control functionality of controller 64 could be provided external to the example RAN entity 60 in another RAN entity which could be communicatively linked with RAN entity 60 and could serve to control at least a portion of the various operations described herein or other aspects of RAN operation generally.

In an example implementation, the controller 64 may be arranged to (i) pass, via the communication interface 62, pre-registration signaling and call-setup signaling between the fallback RAN and UEs served by the RAN to facilitate the CSFB process, (ii) detect a threshold extent of failure of the CSFB process with respect to at least one UE that is served in a first coverage area provided by the RAN, and (iii) responsive to detecting the threshold extent of failure, direct one or more UEs to each hand over from the first coverage area to at least one second coverage area provided by the RAN.

Exemplary embodiments have been described above. Those skilled in the art will understand, however, that changes and modifications may be made to these embodiments without departing from the true scope and spirit of the invention.

What is claimed is:

1. A method for managing wireless communication service comprising:
    providing, by a first radio access network (RAN), a plurality of coverage areas in which to serve user equipment devices (UEs) according to a first air interface protocol, wherein the first RAN is interconnected with a fallback RAN that is configured to serve UEs according to a second air interface protocol, and wherein the first RAN is configured to support an inter-RAN fallback process in which the first RAN passes pre-registration signaling and call-setup signaling between the fallback RAN and UEs served by the first RAN to facilitate transition of UEs from being served over the first air interface protocol by the first RAN to being served with calls over the second air interface protocol by the fallback RAN;
    detecting, by the first RAN, a threshold extent of failure of the inter-RAN fallback process with respect to one or more UEs that are each served by the first RAN in a first coverage area of the plurality of coverage areas provided by the first RAN; and
    responsive to detecting the threshold extent of failure, the first RAN processing handover of at least one UE from the first coverage area provided by the first RAN to at least one second coverage area of the plurality of coverage areas provided by the first RAN.

2. The method of claim 1, wherein the first RAN detecting the threshold extent of failure of the inter-RAN fallback process with respect to the one or more UEs comprises the first RAN (i) receiving from the one or more UEs a quantity of messages specifying failure of the inter-RAN fallback process and (ii) determining that the quantity of messages exceeds a predetermined threshold.

3. The method of claim 1, wherein the first RAN includes a first base station that radiates to define the first coverage area and serves the one or more UEs in the first coverage area, the method further comprising:

responsive to detecting the threshold extent of failure, the first RAN configuring the first base station to broadcast a parameter that indicates that the first base station does not support the inter-RAN fallback process.

4. The method of claim 1, wherein the first RAN includes a first base station that radiates to define the first coverage area and serves the one or more UEs in the first coverage area, and wherein the first base station is configured to broadcast a parameter that indicates that the first base station supports the inter-RAN fallback process, the method further comprising:

responsive to detecting the threshold extent of failure, the first RAN configuring the first base station to not broadcast the parameter that indicates that the first base station supports the inter-RAN fallback process.

5. The method of claim 1, wherein the first RAN includes a first base station that radiates to define the first coverage area and serves the one or more UEs in the first coverage area on a first carrier frequency, wherein the first RAN further includes at least one second base station that is co-located with the first base station and radiates to define the at least one second coverage area, each for serving UEs on a respective second carrier frequency different from the first carrier frequency, and wherein the first RAN processing handover of the at least one UE from the first coverage area to the at least one second coverage area comprises the first RAN processing handover of the at least one UE from the first base station to the at least one second base station.

6. The method of claim 1, wherein the first RAN includes a first base station that radiates to define the first coverage area and serves the one or more UEs in the first coverage area on a first carrier frequency, wherein the first RAN further includes at least one second base station that neighbors the first base station and radiates to define the at least one second coverage area, each for serving UEs on a respective second carrier frequency different from the first carrier frequency, and wherein the first RAN processing handover of the at least one UE from the first coverage area to the at least one second coverage area comprises the first RAN processing handover of the at least one UE from the first base station to the at least one second base station.

7. The method of claim 1, wherein the first RAN processing handover of the at least one UE from the first coverage area to the at least one second coverage area is further responsive to a detection, by the first RAN, of a low extent of failure of the inter-RAN fallback process with respect to the at least one second coverage area.

8. The method of claim 1, further comprising:

before processing handover of the at least one UE from the first coverage area to the at least one second coverage area, the first RAN receiving, from the at least one UE, one or more measurement reports that specify the at least one second coverage area and respective signal strengths of the at least one second coverage area detected by the at least one UE, wherein the first RAN processing handover of the at least one UE from the first coverage area to the at least one second coverage area is based on the one or more measurement reports.

9. The method of claim 1, wherein the first air interface protocol is an Orthogonal Frequency Division Multiple Access (OFDMA) air interface protocol, and wherein the second air interface protocol is selected from the group consisting of a Code Division Multiple Access (CDMA) air interface protocol and a Global System for Mobile Communications (GSM) air interface protocol.

10. A method for managing wireless communication service comprising:

providing, by a first radio access network (RAN), a plurality of coverage areas in which to serve user equipment devices (UEs) according to a first air interface protocol, wherein the first RAN is interconnected with a fallback RAN that is configured to serve UEs according to a second air interface protocol, and wherein the first RAN is configured to support an inter-RAN fallback process in which the first RAN passes pre-registration signaling and call-setup signaling between the fallback RAN and UEs served by the first RAN to facilitate transition of UEs from being served over the first air interface protocol by the first RAN to being served with calls over the second air interface protocol by the fallback RAN;

detecting, by the first RAN, a failure of the inter-RAN fallback process with respect to a particular UE served by the first RAN in a first coverage area of the plurality of coverage areas provided by the first RAN; and responsive to detecting the failure, the first RAN processing handover of one or more UEs, including the particular UE, from the first coverage area provided by the first RAN to at least one second coverage area of the plurality of coverage areas provided by the first RAN.

11. The method of claim 10, wherein the first RAN detecting the failure of the inter-RAN fallback process with respect to the particular UE comprises the first RAN receiving, from the particular UE, a context release request message including data interpretable by the first RAN to indicate the failure of the inter-RAN fallback process.

12. The method of claim 10, wherein the failure of the inter-RAN fallback process with respect to the particular UE is a pre-registration failure of the particular UE, and wherein the first RAN detecting the pre-registration failure comprises:

an entity of the first RAN passing a pre-registration request message from the particular UE to the fallback network;

the entity of the first RAN receiving, from an interworking server (IWS) through which the pre-registration signaling and the call-setup signaling passes between the fallback network and UEs served by the first RAN, a response to the pre-registration request message indicating that pre-registration of the particular UE with the fallback network was unsuccessful; and the first RAN detecting the pre-registration failure based on the message.

13. The method of claim 10, wherein the failure of the inter-RAN fallback process with respect to the particular UE is a pre-registration failure of the particular UE, and wherein the first RAN detecting the pre-registration failure comprises:

an entity of the first RAN monitoring the pre-registration signaling between the fallback network and UEs served by the first RAN;

the entity of the first RAN making a determination that (i) a pre-registration request message has been passed from the particular UE to the fallback network and (ii) a predetermined period of time has expired without the entity having received a response to the pre-registration request message; and the first RAN detecting the pre-registration failure based on the determination.

14. The method of claim 10, wherein the first air interface protocol is an Orthogonal Frequency Division Multiple Access (OFDMA) air interface protocol, wherein the second air interface protocol is selected from the group consisting of a Code Division Multiple Access (CDMA) air interface protocol and a Global System for Mobile Communications (GSM) air interface protocol, and wherein the inter-RAN fallback process is a circuit switched fallback (CSFB) process.

15. The method of claim 14, wherein the first RAN detecting the failure of the CSFB process comprises an entity of the first RAN detecting the failure, wherein the entity is selected from the group consisting of a Long Term Evolution (LTE) evolved Node-B (eNodeB) that radiates to define the first coverage area and a mobility management entity (MME).

16. A radio access network (RAN) comprising:
one or more base stations radiating to define a plurality of coverage areas in which to serve user equipment devices (UEs) according to a first air interface protocol;
a communication interface with a fallback RAN, wherein the fallback RAN is configured to serve UEs according to a second air interface protocol different from the first air interface protocol; and
a controller comprising at least one processing unit, data storage, and program instructions stored in the data storage and executable by the at least one processing unit to carry out operations, the operations comprising:
passing, via the communication interface, pre-registration signaling and call-setup signaling between the fallback RAN and UEs served by the RAN to facilitate a circuit-switched fallback (CSFB) process in which UEs transition from being served over the first air interface protocol by the RAN to being served with calls over the second air interface protocol by the fallback RAN;
detecting a threshold extent of failure of the CSFB process with respect to at least one UE that is served in a first coverage area of the plurality of coverage areas provided by the RAN; and
responsive to detecting the threshold extent of failure, directing one or more UEs to each hand over from the first coverage area to at least one second coverage area of the plurality of coverage areas provided by the RAN.

17. The RAN of claim 16, wherein the one or more base stations include a first base station that radiates to define the first coverage area and further include at least one second base station that neighbors the first base station and radiates to define the at least one second coverage area, the operations further comprising:
receiving an indication that the at least one second base station has detected a low extent of failure of the CSFB process with respect to the at least one second coverage area,
wherein directing the one or more UEs to each hand over from the first coverage area to the at least one second coverage area is further responsive to receiving the indication from the at least one second base station.

18. The RAN of claim 16, the operations further comprising:
before directing the one or more UEs to each hand over from the first coverage area to the at least one second coverage area, receiving, from the one or more UEs, one or more measurement reports that specify the at least one second coverage area and respective signal strengths of the at least one second coverage area detected by the one or more UEs,
wherein directing the one or more UEs to each hand over from the first coverage area to the at least one second coverage area is based on the one or more measurement reports.

19. The RAN of claim 16, wherein detecting the threshold extent of failure of the CSFB process with respect to the at least one UE comprises (i) receiving from the at least one UE quantity of messages specifying failure of the CSFB process and (ii) determining that the quantity of messages exceeds a predetermined threshold and that the quantity of messages was received within a predetermined period of time.

20. The RAN of claim 16, wherein directing the one or more UEs to each hand over from the first coverage area to the at least one second coverage area comprises transmitting, to the one or more UEs, (i) a radio-resource-control (RRC) connection reconfiguration message that specifies the at least one second coverage area and directs the one or more UEs to scan for coverage of the at least one second coverage area, or (ii) a handover-scan-list that specifies the at least one second coverage area.

* * * * *